(12) United States Patent
Robillard et al.

(10) Patent No.: US 11,931,650 B2
(45) Date of Patent: Mar. 19, 2024

(54) TV-TO-GAME SYNC

(71) Applicant: Disney Enterprises, Inc., Burbank, CA (US)

(72) Inventors: Brian Robillard, North Hollywood, CA (US); Michael Peterson, Woodland Hills, CA (US); Julius Harper, Valencia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1095 days.

(21) Appl. No.: 16/748,642

(22) Filed: Jan. 21, 2020

(65) Prior Publication Data

US 2020/0155938 A1    May 21, 2020

Related U.S. Application Data

(62) Division of application No. 13/540,601, filed on Jul. 2, 2012, now Pat. No. 10,569,171.

(51) Int. Cl.
| | |
|---|---|
| *A63F 13/00* | (2014.01) |
| *A63F 13/424* | (2014.01) |
| *A63F 13/69* | (2014.01) |
| *G06Q 30/0207* | (2023.01) |
| *A63F 13/215* | (2014.01) |

(52) U.S. Cl.
CPC ............ *A63F 13/424* (2014.09); *A63F 13/69* (2014.09); *G06Q 30/0209* (2013.01); *A63F 13/215* (2014.09); *A63F 2300/6072* (2013.01); *A63F 2300/609* (2013.01)

(58) Field of Classification Search
CPC ..... A63F 2300/609; A63F 13/69; A63F 13/79
See application file for complete search history.

(56) References Cited

U.S. PATENT DOCUMENTS

| | | | |
|---|---|---|---|
| 7,813,822 B1* | 10/2010 | Hoffberg | ............... H04N 7/163 381/73.1 |
| 2002/0128834 A1 | 9/2002 | Fain et al. | |
| 2003/0037075 A1 | 2/2003 | Hannigan et al. | |
| 2003/0149671 A1 | 8/2003 | Yamamoto et al. | |
| 2005/0177417 A1 | 8/2005 | Koreyasu | |
| 2007/0171066 A1 | 7/2007 | Fein et al. | |
| 2008/0004115 A1 | 1/2008 | Chatani | |
| 2008/0052242 A1 | 2/2008 | Merritt et al. | |
| 2010/0027837 A1 | 2/2010 | Levy et al. | |
| 2011/0099591 A1 | 4/2011 | Long et al. | |
| 2012/0015699 A1 | 1/2012 | Kalvachev | |

(Continued)

OTHER PUBLICATIONS

Dan Eakins, Automatic Content Recognition: Challenges and Solutions for the Mass Market, Zeitera: White Paper, 8 pages, Aug. 8, 2011, Zeitera, Mountain View, CA, United States.

*Primary Examiner* — David L Lewis
*Assistant Examiner* — Eric M Thomas
(74) *Attorney, Agent, or Firm* — Dorsey & Whitney LLP

(57) ABSTRACT

Techniques are disclosed for unlocking in-game content for a video game application. In one embodiment, the video game application may be operated by a user that is concurrently viewing media content. The video game application captures an audio signal from the concurrently-playing media content, performs content recognition on the captured audio signal, and determines whether to unlock one or more portions of in-game content based on the identified media content.

20 Claims, 9 Drawing Sheets

(56) References Cited

U.S. PATENT DOCUMENTS

| | | |
|---|---|---|
| 2012/0062490 A1 | 3/2012 | Heatherly et al. |
| 2012/0304224 A1 | 11/2012 | Hines |
| 2014/0004934 A1* | 1/2014 | Peterson ................ A63F 13/61 |
| | | 463/31 |
| 2015/0113094 A1 | 4/2015 | Williams et al. |

* cited by examiner

400

900

TV-TO-GAME SYNC

CROSS-REFERENCE TO RELATED APPLICATIONS

This application is a divisional of co-pending U.S. patent application Ser. No. 13/540,601, filed Jul. 2, 2012 and is herein incorporated by reference in its entirety.

BACKGROUND

Field

Embodiments of the present disclosure relate generally to video games and, more particularly, to providing players with additional in-game content that augment game play.

Description of the Related Art

Video games have become increasingly popular, particularly for video games played on handheld devices, such as Nintendo Gameboy available from Nintendo Co., Ltd of Japan, or iPhone available from Apple, Inc. of Cupertino, California Typically, such gaming devices executes computer game code from a storage device (e.g., a CD-ROM disc or cartridge) or from a remote source (e.g., via download or streaming) to provide a player with a virtual environment with which they may interact. In some cases, additional content (referred to as downloadable content) for a video game may be made available after the original video game has been distributed, for example, via download. In other cases, video games may include the additional content in the released video game, but make the additional content initially inaccessible to players. Such content, referred to as "locked" or "unlockable content," may be later unlocked by some action performed by a player or user. To generate revenue for the additional content, video game developers have required that players purchase the additional content. However, many consumers are reluctant to engage in monetary transactions for the additional content. Accordingly, there is a demand for other techniques for unlocking in-game content for a video game application that provides value and benefits to the developers of the video game application.

SUMMARY

Embodiments of the present disclosure provide a computer-implemented method, computer program product and system for performing an operation that includes providing a virtual environment having locked content. The operation includes executing, on a computing device, an application to provide a game environment having locked content with a predefined association with one or more keys. The method further includes receiving, on the computing device, data with at least one of audio or video data and processing the received data to generate at least a key of the one or more keys. The method includes unlocking at least a portion of the locked content based on the generated one or more keys to augment gameplay within the game environment.

Embodiments of the present disclosure provide a computer-readable storage medium containing computer-readable program code. The computer-readable program code is configured to, when executed by a processor, perform an operation that includes executing a game environment having locked content that is inaccessible to a user. The locked content may have a predefined association with one or more keys. The operation further includes receiving, on the computing device, an audio data stream captured from an environment external to the computing device, and processing the received audio data stream to generate at least a key of the one or more keys. Responsive to determining the generated key match the one or more keys associated with the locked content, the operation includes modifying the game environment to enable access to the locked content and incorporate the locked content into the game environment.

Additionally, embodiments of the present disclosure provide a computing system for providing a game environment. The computer system includes one or more computer processors, a microphone configured to generate audio data based on sounds from an environment proximate to the computing system, and a memory. The memory includes a program configured to provide a game environment, and locked in-game content with a predefined association with one or more keys. The program, when executed by the one or more computer processors, performs an operation for providing the game environment. The operation includes processing audio data received from the microphone to generate at least a key of the one or more keys, and unlocking at least a portion of the locked in-game content based on the generated one or more keys to augment gameplay of the game environment.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
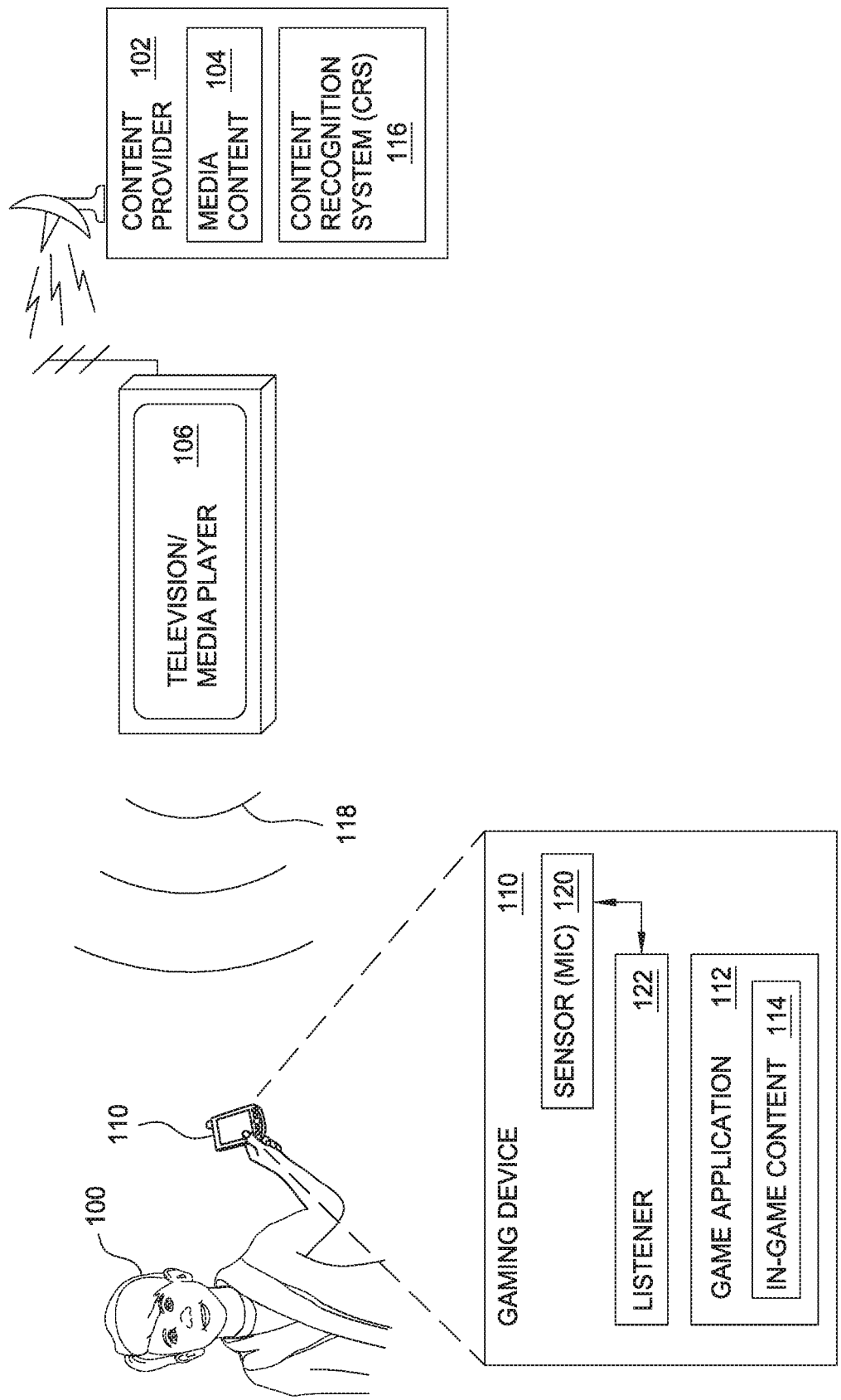
FIG. 1 is a block diagram depicting one embodiment of an infrastructure for a content provider to provide in-game content for a video game application.

Embodiments of the present disclosure generally provide techniques for unlocking in-game content for a video game. One embodiment provides a gaming device having a video game application that is associated with media content, such as a television show broadcast by a television network and displayed on a television. The video game application captures, e.g., from a microphone of the gaming device, an audio signal from the media content being played concurrently with the video game application. The video game application uses content recognition techniques to identify the media content from the capture audio signal and, based on the recognized media content, unlocks "premium" in-game content that augment gameplay of the video game application.

As such, the video game application detects that a player is watching the associated media content while concurrently playing the video game application and provides an incentive for players to tune into a particular broadcast of a television show or other media content associated with the video game application. Accordingly, a video game developer obtains value and benefit from providing unlockable in-game content by increasing viewership and audience ratings of the associated media content. Furthermore, while other approaches to in-game content have used manual code entry or time-limited experiences to release hidden content in games in coordination with on-air events, embodiments of the present disclosure advantageously detect when the player is watching an associated television show and seamlessly augments the gameplay of the video game by unlocking the premium in-game content.

Reference is made herein to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 depicts one embodiment of an infrastructure for a content provider to provide in-game content for a video game application. A user 100 operates a gaming device 110 configured to execute a video game application 112 that provides a virtual gaming environment with which the user 100 may interact. For example, the video game application 112 may provide a racing game that enables the user 100 to control a race car within one or more racing tracks to compete against computer-controlled or human-controlled race cars.

As shown in an enlarged view, the gaming device 110 includes in-game content 114 that is included within the video game application 112 but is made inaccessible to the user. According to one embodiment, the video game application 112 is configured to unlock the in-game content 114 based on an association with one or more works of media content 104, as described in detail below. When made accessible, in-game content 114 may augment gameplay of the video game application 112 by providing, for example, additional playable characters, bonus levels, power-ups, in-game currency.

A content provider 102 generally provides the one or more works of media content 104 to audiences, such as user 100. For example, content provider 102 may provide media content 104, such as television shows, live broadcasts, radio programs, and podcasts, which may be viewed by audiences using a television 106 or other suitable media player. The content provider 102 coordinates with a content recognition system 116 to be able to uniquely identify each work of media content 104 based on some data signal, such as an audio or video layer of the media content 104. The content provider 102 then distributes the media content using any of a number of suitable distribution channels, such as broadcast, cable transmission, and internet streaming.

In one embodiment, to unlock one or more portions of in-game content 114, the user 100 operates the gaming device 110 to play the video game application 112 while concurrently watching media content 104 encoded with the watermark, for example, playing on the television 106. An audio portion (embodied as sound waves 118) of the media content 104 is emitted from the television 106 and is captured by a sensor device 120 (e.g., microphone) of the gaming device 110. A listener component 122 of the video game application 112, which acts a local component of the content recognition system 116, processes the captured audio signal provided by the sensor device 120 and recognizes the captured audio signal as being part of a particular work of media content 104. Based on the processing of the captured audio signal, the video game application 112 may unlock one or more portions of in-game content 114 according to the detected watermark, the associated media content 104, and one or more rules for unlocking in-game content 114, further described below.

Unlocking In-Game Content Via Watermarking

In one embodiment, a content recognition technique referred to as "watermarking" is utilized which involves inserting a signal into the video and/or audio portion of the media content. Generally, prior to distribution, the media content 104 is encoded with "watermark" data that is generally imperceptible to humans but may be decoded and detected by the video game application. The video game application receives, from a microphone of the gaming device, an audio signal from the media content and decodes the audio signal to identify one or more keys. The video game application uses the one or more keys to unlock "premium" in-game content that augment gameplay of the video game application.

Figure 2:
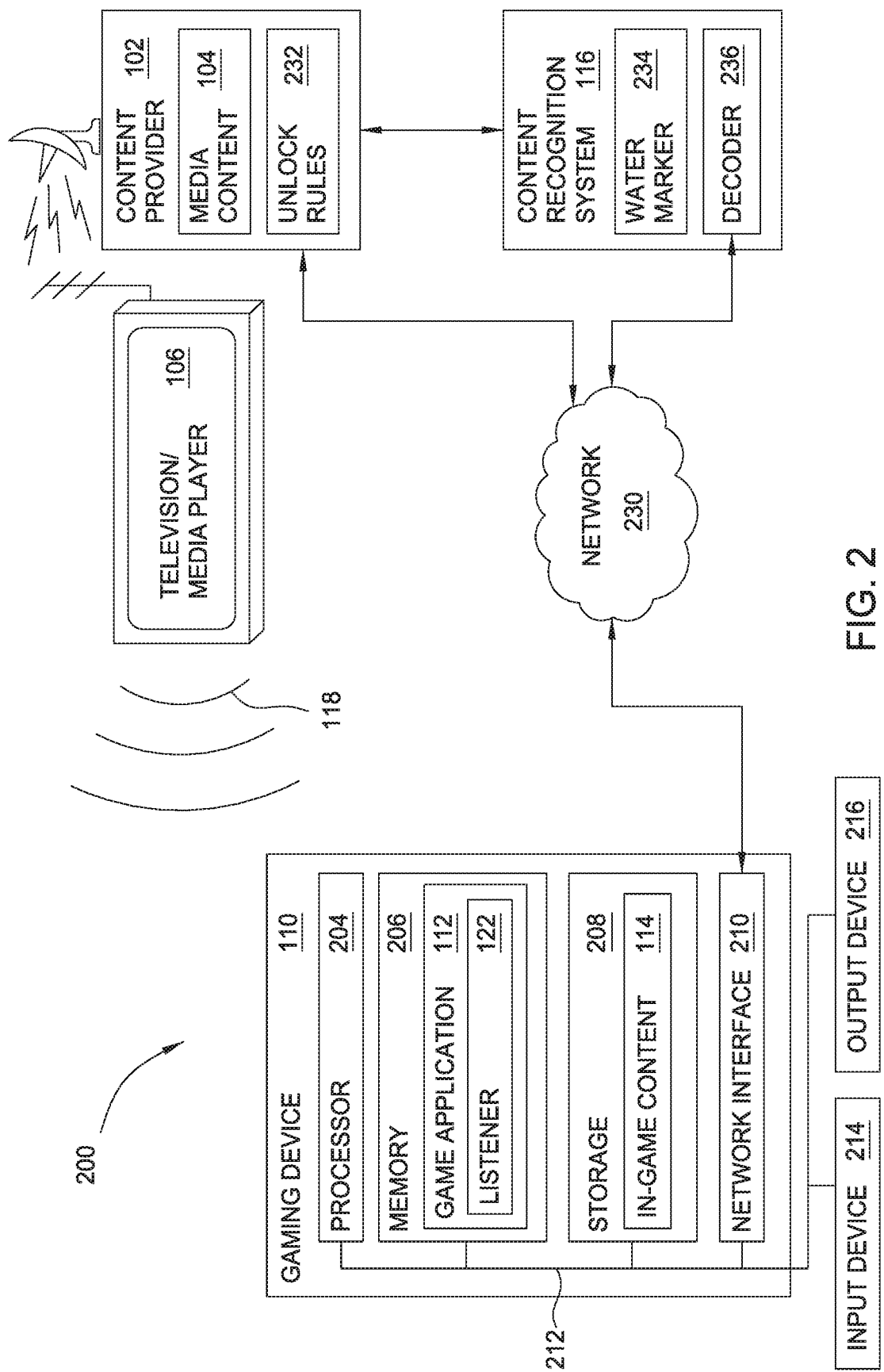
FIG. 2 is a block diagram illustrating a system for providing unlockable in-game content for a video game application, according to one embodiment of the present disclosure.

FIG. 2 is a block diagram illustrating one embodiment of a system 200 for providing unlockable in-game content for a video game application. The system 200 generally includes a content provider 102, a content recognition system 116, and a gaming device 110. The gaming device 110 may be connected to computers of the content provider 102 and the content recognition system 116 via a network 230. In general, the network 230 may be a telecommunications network and/or a wide area network (WAN). In a particular embodiment, the network 230 is the Internet.

In one embodiment, the content provider 102 stores one or more works of media content 104 and a plurality of unlock rules 232. Media content 104 generally refers to any work or production containing audio and/or video data that may be arranged in formats such as video recordings, audio recordings, and live broadcasts of video and/or audio. Examples of media content 104 include television shows, motion pictures, radio shows, music videos, commercial advertising, and webcasts. In some embodiments, one of more works of media content 104 are associated or affiliated with the video game application 112 such that elements of the media content 104 are incorporated into the video game application. For example, the video game application 112 may be an action game based on the story from a corresponding television show or motion picture.

The content provider 102 may specify a plurality of unlock rules 232 that indicate how media content 104 may be used to unlock in-game content 114 of the video game application 112. The unlock rules 232 may associate a particular work of media content 104 with a corresponding portion of in-game content 114 of the video game application 112. For example, the unlock rules 232 may specify that a particular television show episode is associated with an unlockable character of the video game, such that viewing the particular television show while playing the video game application 112 results in unlocking the associated character.

The unlock rules 232 may specify additional criteria that supplements the association between the media content 104 and the in-game content 114 for unlocking in-game content. In some embodiments, the unlock rules 232 may specify a time period for which an association between media content 104 and in-game content 114 is deemed active and valid. For example, the unlock rules 232 may specify a 48-hour window from when a particular television show episode is distributed such that only a viewing of the episode inside of the 48-hour window will result in a corresponding unlocking of in-game content 114.

In some embodiments, the content provider 102 may provide the plurality of unlock rules 232 to other entities, such as the content recognition system 116 or the video game application 112, to facilitate a distributed system for unlocking in-game content 114. For example, the content provider 102 may periodically provide unlock rules 232 and updates to the unlock rules 232 to a content recognition system 116 configured to handle unlock requests, as described in further detail below. In another example, the content provider 102 may periodically provide unlock rules 232 and updates to the unlock rules 232 to the video game application 112 to enable the video game application 112 to locally determine whether to unlock portions of in-game content 114. Alternatively, in some embodiments, the content provider 102 may use the plurality of unlock rules 232 to directly respond to requests to unlock in-game content 114 based on viewership of media content 104.

In one embodiment, the media content 104 may be provided to content recognition system 116 to be encoded with a watermark prior to distribution to audiences. In the embodiment shown in FIG. 2, the content recognition system 116 includes a watermark component 234 and a decoder component 236. The watermark component 234 is configured to receive data having audio and/or video data that represents one or more works of media content 104 and encode the received content data with metadata referred to herein as keys, and which may be used to uniquely identify the content data. In the specific embodiment described herein, the key data may be embodied as a watermark, which is data integrated into a data source to identify the data source and provide other metadata to facilitate unlocking of in-game content 114 for the video game application 112. In one embodiment, the watermark component 234 is configured to embed the watermark within a data source using an encoding process that manipulates the content of the data source, rather than being embedded in a frame around the content. In some embodiments, the watermark may be embedded in the data source in a manner that is unperceivable or nearly-unperceivable to humans but can be detected by electronic sensors, such as a microphone. For example, in some embodiments, the watermark may be one or more acoustically masked audio data packets that are embedded within an audio layer (sometimes referred to as the "sound track") of media content 104. In other embodiments, the watermark may include a perceivable or noticeable element that indicates to audiences that the media content 104 has been encoded with the watermark for the video game application 112. For example, a watermark embedded in a work of media content 104 may provide to users a visual display that advertises the media content 104 as being associated with the video game application 112.

In the embodiment of FIG. 2, the content recognition system 116 further includes a decoder component 236 configured to receive data and determine whether the received data indicates any of in-game content 114 should be unlocked. In one embodiment, the decoder component 236 is configured to determine whether to unlock a portion of in-game content 114 based one or more watermark codes that have been extracted or decoded from an encoded work of media content 104 and according to one or more unlock rules 232. In some embodiments, the decoder component 236 may receive one or more watermark codes that already have been extracted or decoded from an encoded work of media content 104, for example by the video game application 112, described later. In other embodiments, the decoder component 236 may be configured to receive samples of encoded data and perform a decoding process that detects and extracts one or more watermark codes, if any, from the received samples. For example, the decoder component 236 may be configured to receive and decode short segments of audio content (e.g., as captured from a microphone of gaming device 110).

In one embodiment, the gaming device 110 generally includes a processor 204 connected via a bus 212 to a memory 206, a network interface device 210, a storage 208, an input device 214, and an output device 216. The gaming device 110 is generally under the control of an operating system. Examples of operating systems include UNIX, versions of the Microsoft Windows® operating system, and distributions of the Linux® operating system. More generally, any operating system supporting the functions disclosed herein may be used. The processor 204 is included to be representative of a single CPU, multiple CPUs, a single CPU having multiple processing cores, and the like. Similarly, the memory 206 may be a random access memory. While the memory 206 is shown as a single entity, it should be understood that the memory 206 may comprise a plurality of modules, and that the memory 206 may exist at multiple levels, from high speed registers and caches to lower speed but larger DRAM chips. The network interface device 210 may be any type of network communications device allowing the gaming device 110 to communicate with other computers via the network 230. For example, the network interface device 210 may provide wireless connectivity to other computers via the network 230.

The storage 208 may be a hard disk drive storage device. Although the storage 208 is shown as a single unit, the storage 208 may be a combination of fixed and/or removable storage devices, such as fixed disc drives, floppy disc drives, tape drives, removable memory cards, or optical storage. The memory 206 and the storage 208 may be part of one virtual address space spanning multiple primary and secondary storage devices.

The input device 214 may be any device for providing input to the gaming device 110. For example, a keyboard and/or mouse may be used. According to one embodiment, the input device 214 may include one or more sensors configured to provide an input signal based on stimulus from an environment external to the gaming device 110. For example, the input device 214 may be a microphone configured to capture sound and convert the sound into an audio data signal. In another example, the input device 214 may include a camera or other image-capturing device configured to capture light and convert the light into a video signal or other image-based data signal. The output device 216 may be any device for providing output to a user of the gaming device 110. For example, the output device 216 may be any conventional display screen or set of speakers, along with their respective interface cards. Although shown separately from the input device 214, the output device 216 and input device 214 may be combined. For example, a display screen with an integrated touch-screen may be used.

It is specifically contemplated that embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access applications (e.g., a computer game) or related data available in the cloud. For example, the computer game described herein could execute on a computing system in the cloud, thereby allowing users to access the game from any computing system attached to a network connected to the cloud (e.g., the Internet). Similarly, a state of in-game content (e.g., locked, unlocked) described herein could be stored in the cloud and incorporated into the computer game accessed by a particular user.

As shown, the memory 206 of the gaming device 110 includes a video game application 112 having a listener component 122. In one embodiment, the video game application 112 is an application configured to provide a virtual environment of a video game. In one embodiment, the video game may be of one or more of the following genres: action, adventure, arcade, role-playing, simulation, sports, racing, fighting, shooting, shooter, strategy, and puzzle. Additionally, the video game may also be a massively multiplayer online role-playing game (MMORPG). As an example, the video game may be a racing game for which a primary game objective is to race along a race course, either against the clock or against other computer- or player-controlled characters. The racing may occur over land, sea, and/or air, and may involve appropriate vehicles. Further, the racing may occur from a first- or third-person perspective for the player.

In some embodiments, the video game application 112 includes one or more avatars that may be player-controlled or computer-controlled. An avatar generally refers to any visual object in the video game which movement and/or actions may be controlled directly by a player or a computer (instead of indirectly through controlling another visual object in the computer game). For example, the avatar may be a player character, a player vehicle, or any other character or object which role the player or computer assumes over a course of playing the computer game (e.g., a monster or a villain). The avatar may also be a non-player character (NPC) in the computer game.

As shown, the storage 208 of the gaming device 110 includes in-game content 114 that comprise playable subject matter for the video game application 112. The video game application 112 incorporates various elements of in-game content 114 to provide a virtual gaming environment to a user or player. The in-game content 114 may include player-controlled or computer-controlled avatars, stages or levels of gameplay, modes of gameplay having different game objectives, and in-game cinematics (sometimes referred to as "cut scenes"). The in-game content 114 may further include customizations to the visual appearance of one or more avatars, as well as customizations to the functional abilities of one or more avatars (e.g., power-ups, upgrades).

In one embodiment, some portion of the in-game content 114, sometimes referred to as "unlockable" content, is included within the video game application 112 but is made inaccessible to the user 100 during operation of the video game application 112. When made accessible using techniques described herein, unlockable in-game content 114 provides additional gameplay content for the video game application 112, for example, by providing additional playable avatars, bonus levels, power-ups, in-game currency, etc.

A player may gain access to the in-game content 114 within the video game application 112 according to techniques described herein. In one embodiment, the video game application 112 includes a listener component 122 that receives and processes data having at least audio or video data. Generally, the listener component 122 is configured to determine whether the received data contains a watermark, key, identifier, or other encoding that may be used to determine whether one or more portions of in-game content 114 should be unlocked. In some embodiments, the listener component 122 is configured to perform a decoding process on the received data that detects a presence of a watermark in the received data and extracts information (e.g., watermark codes) from the received data. The listener component 122 may be configured to transmit an unlock request having the extracted watermark information to the decoder component 236 of the content encode 116.

In some embodiments, the video game application may be configured to unlock in-game content 114 using other suitable techniques, in additional to using encoded media content. For example, in one approach, the in-game content 114 may be unlocked by a player's progress through the video game and by accomplishing one or more gaming objectives. For example, additional in-game content for a racing game may be unlocked by completing and winning all races within the video game application. Further, the in-game content 114 may be unlocked by achievement of one or more meta-goals defined outside of the video game's parameters, for example, by collecting a certain number of special "wheels" or other bonus items during races or, in another example, by completely races under by a pre-determined time limit. In another approach, the in-game content 114 may be unlocked by monetary transactions that purchase access to the in-game content 114. It should be recognized that any of the techniques described above may be combined in any suitable combination. For example, a player may earn an in-game currency during gameplay (e.g., special "wheels") that may be later traded in for access to the in-game content 114. The player may also using real monetary transactions to purchase additional amounts of in-game currency, which, in turn, may be traded in for access to the in-game content 114.

It should be recognized that various modifications and changes may be made to the specific embodiments described herein without departing from the broader spirit and scope of the invention as set forth in the appended claims. As such, any combination of different components (e.g., listener component 122, content provider 102, content recognition system 116, watermark component 234, decoder component 236) may be used in coordination with unlocking of in-game content for the video game application. For example, while the foregoing description has discussed embodiments using a content recognition system 116 separate from content provider 102, it should be recognized that application logic of the watermark component 234 may be incorporated into the content provider 102 such that media content 104 is encoded "on-the-fly" as it is being distributed to audiences. Similarly, while the foregoing embodiments have described a decoder component 236 external to the gaming device 110, it should be recognized that the application logic of the decoder component 236 may be incorporated into the listener component 122. As such, the listener component 122 may request unlock rules 232 from content provider 102 and apply the unlock rules 232 itself to determine whether to unlock any of in-game content 114 based on the extracted watermark information. Similarly, in another example, the listener component 122 may delegate the decoding process to a third-party, such as a decoder component 236, and transmit an unlock request, to the decoder component 236, with a sample of encoded data captured from input device 214. It should further be recognized that multiple instances of the various components of content provider 102, content recognition system 116, and video game application 112 (e.g., listener component 122, watermark component 234, decoder component 236, etc.) may be implemented in alternative embodiments, for example, for scalability purposes. Furthermore, although the foregoing embodiments have focused on the use of a watermark embedded in an audio signal, it should be recognized that any data signal, including video, audio, electrical, or magnetic signals may be embedded with a watermark or other suitable data encoding.

Figure 3:
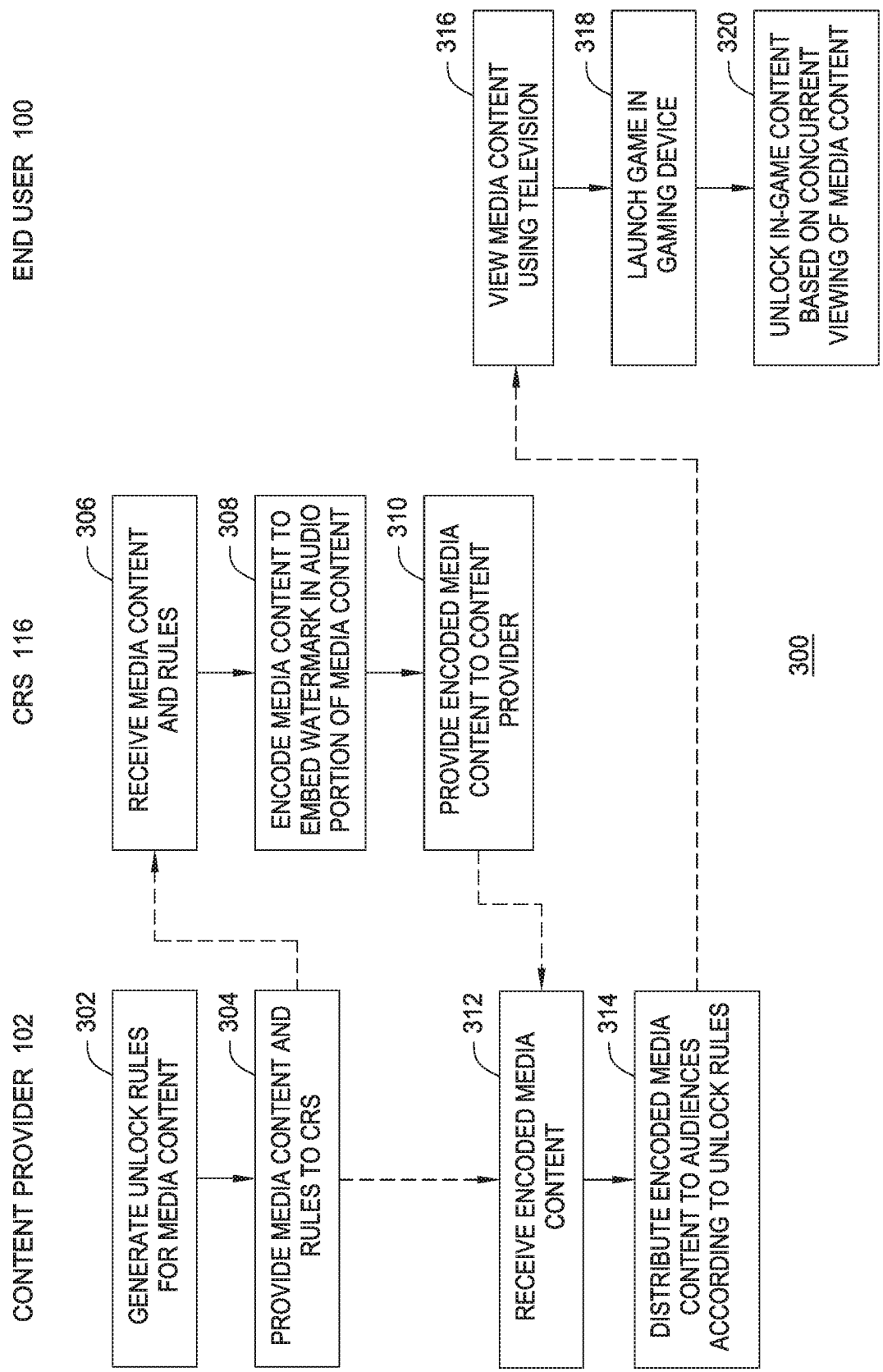
FIG. 3 is a flowchart depicting a method for providing encoded media content to video game players, according to one embodiment of the present disclosure.

FIG. 3 is a flowchart depicting a method 300 for providing unlockable in-game content to a video game application, according to one embodiment of the disclosure. It should be recognized that, even though the method is described in conjunction with the systems of FIG. 1 and FIG. 2, any system configured to perform the method steps, in any order, is within the scope of embodiments of the disclosure.

As shown, the method 300 begins at step 302, where the content provider 102 generates one or more unlock rules 232 for media content 104. In some embodiments, the unlock rules 232 may specify how a watermark may be encoded in data of the media content 104, what information is included in watermark, and the watermark may be used to unlock the in-game content 114 at a later time. In step 304, the content provider 102 provides one or more works of media content 104 and associated unlock rules 232 to the content recognition system 116. In step 306, the content recognition system 116 receives the one or more works of media content 104 and the plurality of unlock rules 232.

In step 308, the content recognition system 116 encodes the media content 104, for example, using the watermark component 234, to embed a watermark in an audio portion of the media content 104. In some embodiments, the watermark may include information that identifies media content 104. For example, the watermark may include information such as an identifier of the content provider 102 or an identifier of the particular work of media content 104 in which the watermark is embedded. In some embodiments, the content recognition system 116 uses information specified by the plurality of unlock rules 232 to generate a watermark for a particular work of media content 104. For example, the watermark may include an arbitrary key value assigned to the media content 104 by content recognition system 116. In some embodiments, the watermark embedded in a work of media content 104 may include additional metadata such as a date/time stamp indicating when the media content 104 was encoded, a date/time stamp indicating an intended date and time of distribution, and a date/time stamp indicating an expiration date for the watermark.

In step 310, the content recognition system 116 provides an encoded version of the media content 104 to the content provider 102, which, in turn, receives the encoded media content in step 312. In some embodiments, the content provider 102 may store the encoded version of media content 104 in one or more storage systems for later distribution and/or archival purposes.

In step 314, the content provider 102 distributes the encoded version of media content 104 to audiences according to the one or more unlock rules 232. The content provider 102 may distribute the encoded version of media content using any of a number of suitable distribution channels, such as broadcast, cable transmission, and internet streaming. For example, the content provider 102 may only broadcast an encoded version of a television show at a particular time according to an unlock rule 232 that specifies a 48-hour window of time in which a watermark embedded in the television show episode is active. In another example, the content provider 102 may instead use an un-encoded version of the media content 104 when broadcasting outside of the 48-hour window of time specified by the unlock rules 232. In the embodiment illustrated in FIG. 1, the content provider distributes the encoded version of the media content 104 is distributed using the encoded media content 104 using the television medium.

In step 316, a user 100 (e.g., Alice) views the distributed media content using a television 106 (or any suitable player of media content). In step 318, while concurrently viewing the encoded media content 104, the user 100 launches the video game application 112 within the gaming device 110. In step 320, the video game application 112 unlocks one or more portions of in-game content 114 based on the concurrent viewing of the encoded media content 104. Step 320 is further described in conjunction with FIG. 4.

Figure 4:
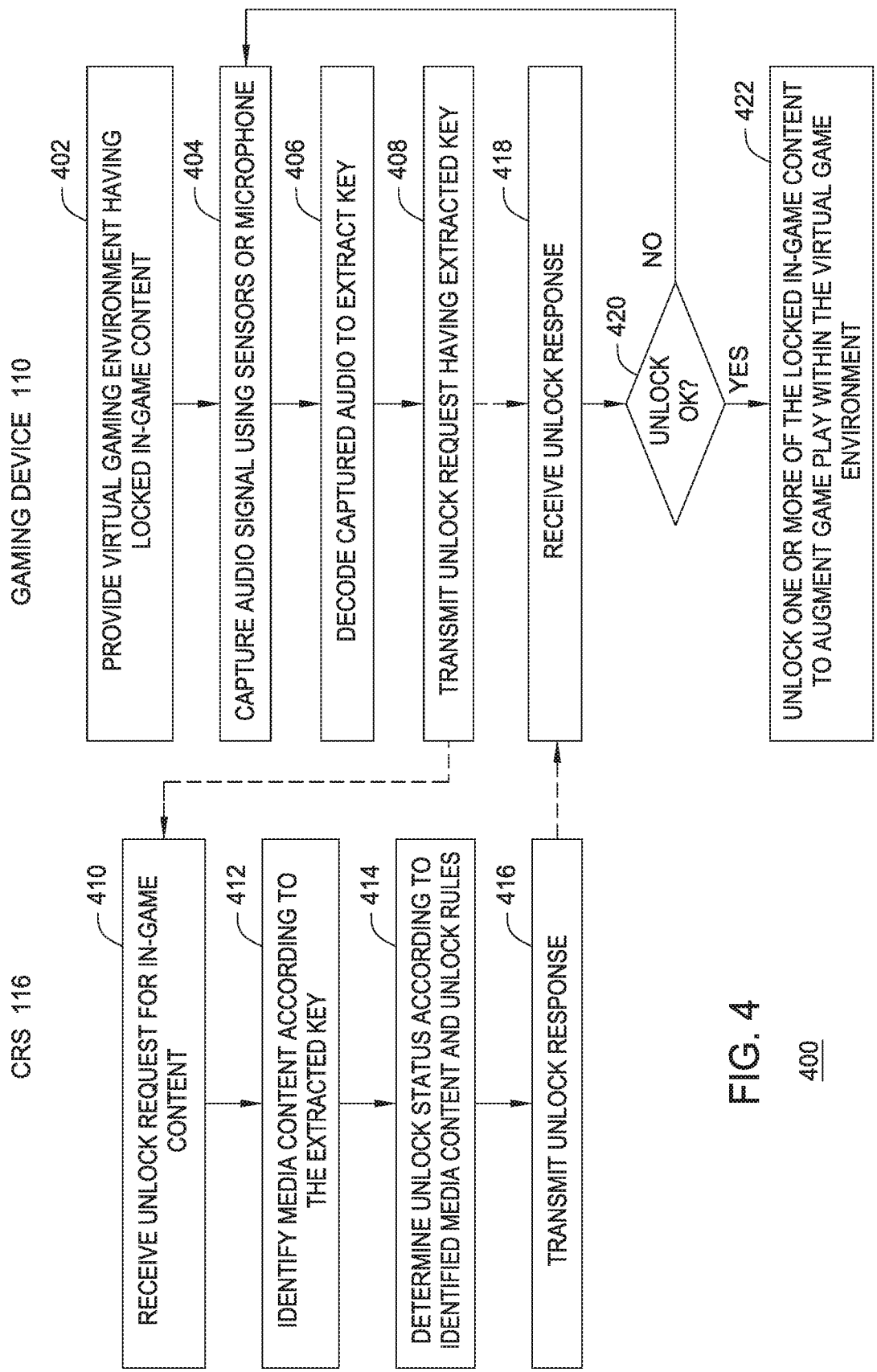
FIG. 4 is a flowchart depicting a method for modifying a video game based on received encoded media content, according to one embodiment of the present disclosure.

FIG. 4 is a flowchart depicting a method 400 for modifying a video game application 112 based on received encoded media content 104, according to one embodiment of the present disclosure. As with FIG. 3, it should be recognized that, even though the method is described in conjunction with the systems of FIG. 1 and FIG. 2, any system configured to perform the method steps, in any order, is within the scope of embodiments of the invention.

In step 402, the gaming device 110 executes the video game application 112 to provide a virtual gaming environment having unlockable in-game content 114. In some embodiments, the unlockable in-game content 114 may be displayed to a user within the virtual environment to indicate which portions of in-game content 114 can be unlocked. For example, in an interactive menu where a user chooses an avatar for gameplay, one or more avatars that comprise unlockable content may be displayed but are rendered disabled or unavailable for selection. In another example, in-game content 114 may be displayed, to a user, in an itemized inventory of in-game content 114 that indicates a description of the in-game content (e.g., "Ability to play using Starfish character") and a state of the in-game content (e.g., "unlocked," "locked"). Alternatively, the unlockable in-game content 114 may be hidden from users to provide secret supplemental content (sometimes referred to as "Easter eggs") to the video game application 112.

In step 404, the gaming device 110 generates an audio signal based on sound captured from an environment proximate to the gaming device 110 using input devices 214, such as a microphone of the gaming device 110. For example, if the user 100 is operating the gaming device 110 while in a same room as a television 106 playing encoded media content 104 (e.g., show or movie), a microphone of the gaming device 110 picks up the sound from the television.

In step 406, the listener component 122 of the video game application 112 decodes the captured audio signal to identify one or more "keys" (e.g., watermark codes) embedded therein. In one embodiment, the listener component 122 performs a decoding process that extracts one or more keys from data of the capture audio signal. In step 408, the listener component 122 of the video game application 112 transmits an unlock request that includes the extracted keys to the content recognition system 116, which, in turn, receives the unlock request in step 410. In some embodiment, the unlock request may include information identifying the video game application 112, the gaming device 110, and other metadata.

In step 412, the decoder component 236 of the content recognition system 116 identifies the media content according to the extracted key provided by the unlock request. In one embodiment, the decoder component 236 matches one of the received keys with at least one keys stored in a database of reference keys and watermarks of the content recognition system 116.

In step 414, the content recognition system 116 determines an unlock status according to the identified media content and one or more unlock rules 232. For example, the content recognition system 116 may determine that an unlock rule 232 authorizes one or more portions of in-game content 114 to be unlocked based on a concurrent viewing of the media content identified by the extracted keys. In step 416, the decoder component 236 transmits an unlock response indicating the determination made in step 414. In step 418, the listener component 122 of the video game application 112 receives the unlock response.

In step 420, the listener component 122 processes the unlock response received from the decoder component 236. Responsive to determining that one or more portions of in-game content 114 are not to be unlocked, the method 400 returns to step 404 and continues to capture and decode audio picked up from the microphone of the gaming device 110 until a key or watermark code has been identified from decoding the captured audio data.

In step 422, responsive to determining that one or more portions of in-game content 114 are to be unlocked, the video game application 112 modifies a state of the in-game content 114 to represent that the in-game content has been unlocked. The video game application 112 then modified the virtual gaming environment to incorporate the unlocked in-game content 114. For example, assuming that the video game application 112 provides a racing game, the video game application 112 may modify the virtual gaming environment to include additional avatars (e.g., racers), power-up such as speed boosts or shields, additional modes of gameplay, such as elimination rounds or versus mode, and additional race tracks.

In some embodiments, the video game application 112 modifies the virtual gaming environment with a persistent change that incorporates the unlocked portion of locked content. For example, changes to the virtual gaming environment may persistent between gaming sessions, such that the unlocked portion of locked content remains available after the video game application has been terminated and later re-started. Additional examples of modifying the virtual gaming environment are described further in conjunction with FIGS. 5A-5B, and 6A-6B.

Figure 5A:
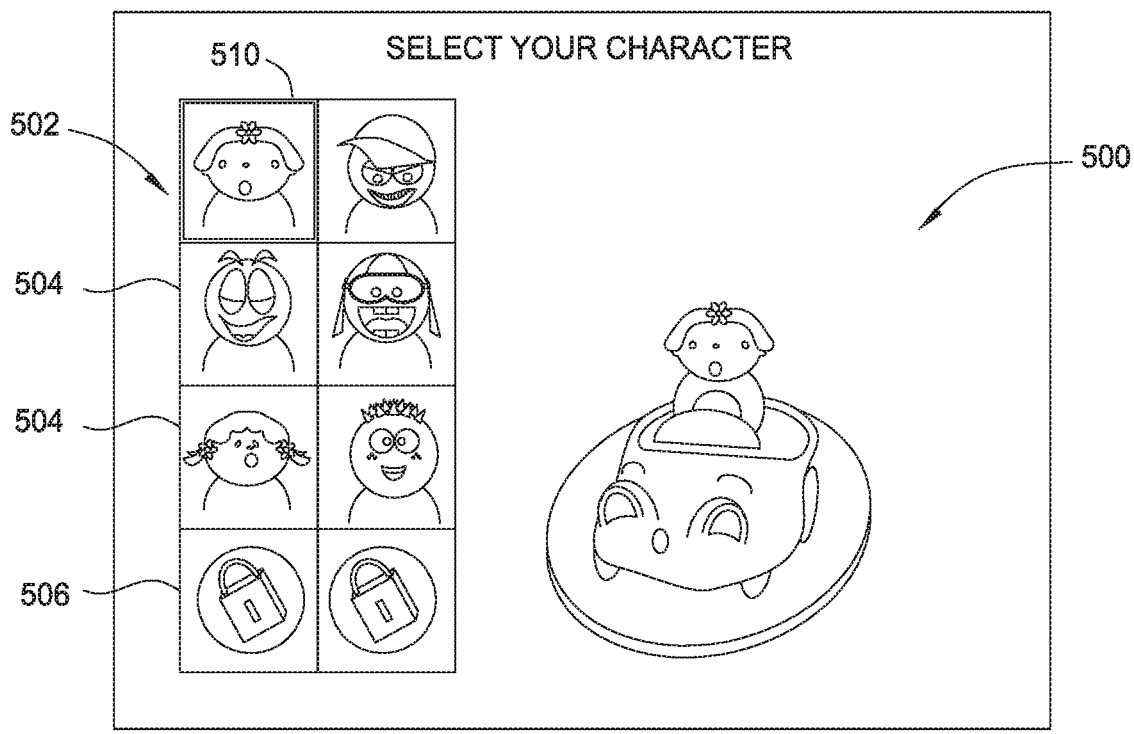
FIGS. 5A and 5B illustrate an exemplary graphical user interface output by the video game, before and after modification based on received encoded media content, according to one embodiment of the present disclosure.

FIG. 5A illustrates an exemplary graphical user interface (GUI) screen 500 generated by the video game application 112, according to one embodiment of the present disclosure. The GUI screen 500 includes an interactive menu 502 that displays a plurality of icons 504, where each icon 504 represents a player-controllable avatar. A user 100 may interact with the menu 502, for example, using a cursor 510, to select an avatar to control within the video game. In the example shown, the user 100 selects a racing character having particular characteristics (e.g., speed, agility) to control and compete in a race course. As shown, one or more of the icons 504 represent in-game content 114 that is not available for selection by the user, as depicted with a padlock-style icon 506. In some embodiments, if a user 100 attempts to select locked in-game content, the GUI screen 500 may notify the user 100 that viewership of a particular work of encoded media content 104, available at a particular date and time, may result in unlocking of the in-game content 114.

Figure 5B:
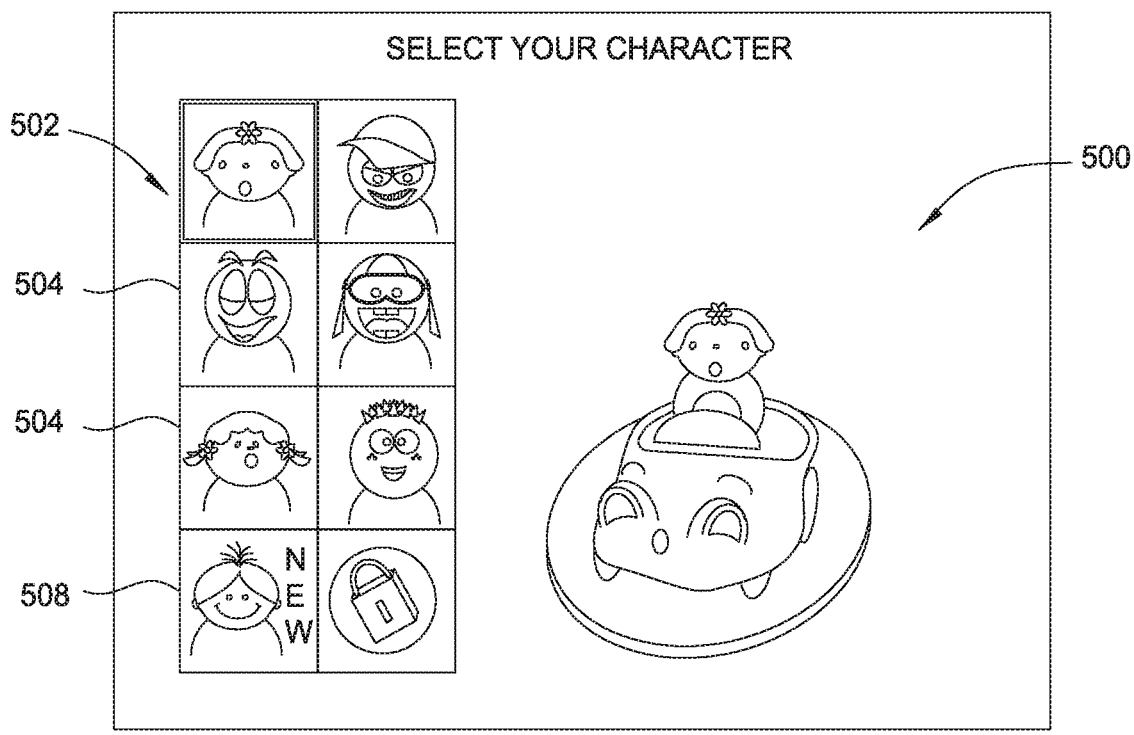

In one embodiment, responsive to unlocking one or more portions of in-game content 114 according to techniques described herein, the video game application 112 incorporates the unlocked in-game content 114 into the virtual environment to augment gameplay. FIG. 5B illustrates the example GUI screen 500 shown in FIG. 5A subsequent to one or more portions of the in-game content 114 being unlocked. As shown, the video game application 112 modifies the interactive menu 502 to display an additional icon 508 that represents a new player-controllable avatar unlocked from in-game content 114. Accordingly, the user 100 may select the new avatar to use within the video game application 112.

Figure 6A:
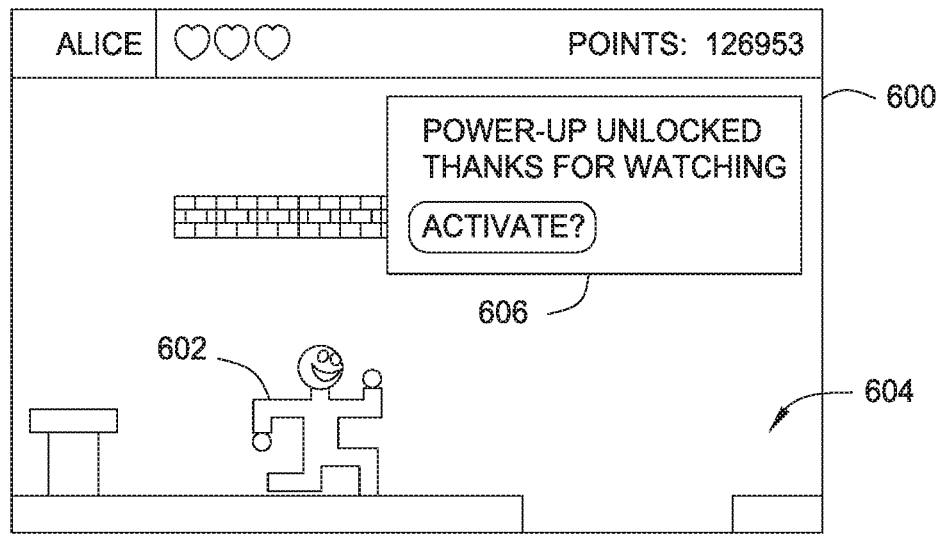
FIGS. 6A and 6B illustrate another exemplary graphical user interface output by the video game, before and after modification based on received encoded media content, according to one embodiment of the present disclosure.

According to one embodiment, the video game application 112 is configured to modify a virtual environment of the video game to incorporate unlocked in-game content while a user 100 may be actively engaged in the video game. FIG. 6A illustrates an example GUI screen 600 generated by the video game application 112, according to one embodiment of the present disclosure. The GUI screen 600 includes an avatar 602 controlled by the user 100 within a game environment 604. While the user 100 is actively operating the video game application 112, the GUI screen 600 generates one or more notification messages 606 to notify the user 100 that some in-game content 114 has been successfully unlocked.

Figure 6B:
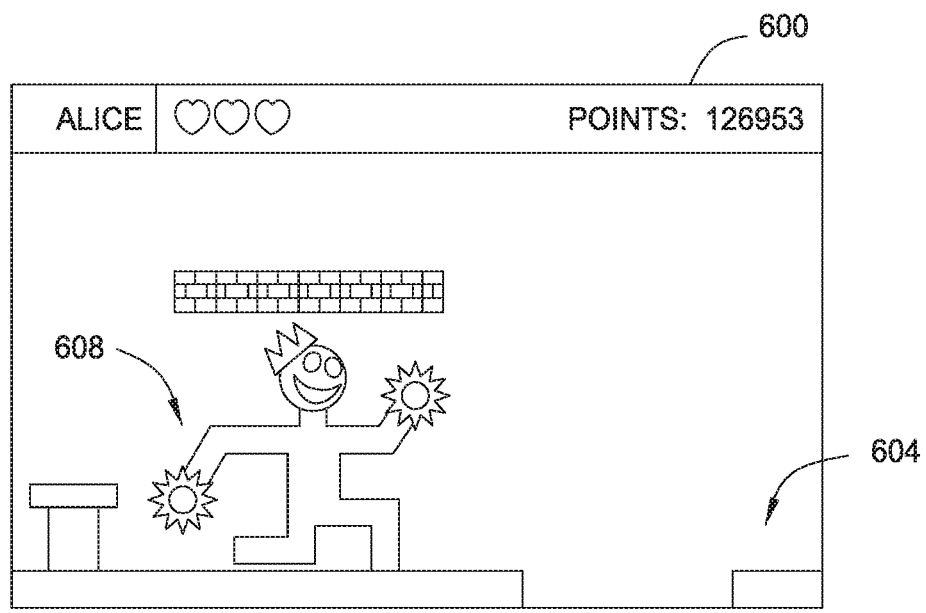

FIG. 6B illustrates the example GUI screen 600 shown in FIG. 6A subsequent to one or more portions of the in-game content 114 being unlocked. Assuming that the in-game content has unlocked a power-up or upgraded ability for the avatar 602 controlled by the player, the video game application 112 modifies the game environment 604 to replace the avatar 602 with an upgraded avatar 608, as shown in FIG. 6B. Accordingly, the video game application 112 provides a seamless experience of having media content 104 played on television 106 influence the video game application 112 on the gaming device 110 in real-time.

In some embodiments, the notifications 606 may an alert that interrupts gameplay of the video game application and that may be dismissed by the user to resume gameplay. In other embodiments, the notifications 606 may be generated as a non-interruptive alert message that fades away after some period of time. In some embodiments, the notifications 606 may demand an action from the user 100, for example, to indicate whether newly unlocked in-game content should be applied immediately to the game environment 604. For example, the video game application 112 may query the user 100 via notification 606 to determine whether to immediately apply or activate an unlocked upgrade or power-up ability. In other embodiments, the notifications 606 may notify the user 100 that unlocked in-game content 114 has been applied to the game environment 604, or will later be available when the user 100 begins a new game or session of the video game.

Unlocking In-Game Content Via Fingerprinting

In alternative embodiment of the present disclosure, the infrastructure for providing unlockable in-game content for a video game application may use a content identification approach referred to as "fingerprinting". Rather than modify the media content 104, content fingerprinting is a technology that algorithmically analyzes characteristics of video and/or audio portions of media content and compares those characteristics with a reference database of pre-processed media content.

Figure 7:
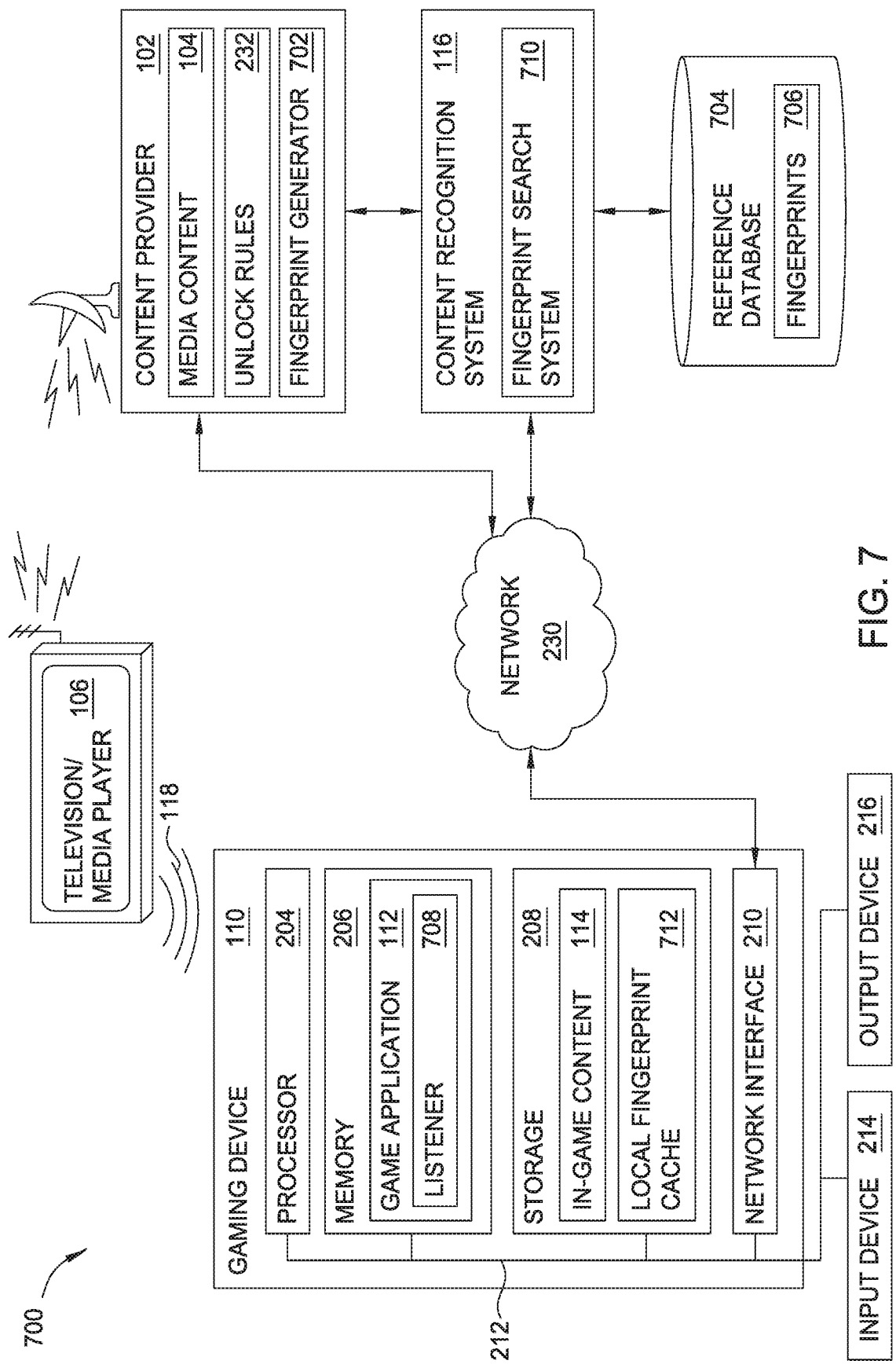
FIG. 7 is a block diagram illustrating an alternative embodiment of a system for providing unlockable in-game content for a video game application.

FIG. 7 is a block diagram illustrating one embodiment of a system 700 for unlocking in-game content for a video game application using fingerprinting techniques. Similar to the system 200 seen in FIG. 2, the system 700 includes a content provider 102, a content recognition system 116, and a gaming device 110. The content provider 102 stores one or more works of media content 104 and a plurality of unlock rules 232 that indicate how media content 104 may be used to unlock in-game content 114 of the video game application 112.

In contrast to embodiments described above, the content provider 102 utilizes fingerprinting techniques to analyze media content 104 to maintain a reference database of keys, or "fingerprints," that unique identify each work of media content. As shown, the content provider 102 includes a fingerprint generator 702 configured to process works of the media content 104 and generate key data (in this embodiment, also referred to as "fingerprints" or "signatures") that uniquely identify the works of media content 104. The content provider 102 is configured to communicate with the content recognition system 116 to provide the content recognition system 116 with new or updated fingerprints 706, as well as to query the content recognition system 116 in response to unlock requests received from the game application 112.

The content recognition system 116 includes a fingerprint search system 710 and a reference database 704 that stores fingerprints 706 in a searchable data structure, such an index. Each stored fingerprints 706 with the reference database 704 is associated with a unique work of media content 104. The fingerprint search system 710 is configured to execute one or more queries to match (or substantially match to a pre-determined likelihood of similarity, e.g., 97% match) an input fingerprint with a fingerprint 706 stored within the reference database 704.

Similar to the embodiment shown in FIG. 2, the gaming device 110 generally includes a processor 204 connected via a bus 212 to a memory 206, a network interface device 210, storage 208, an input device 214, and an output device 216. The memory 206 of the gaming device 110 includes a video game application 112 having a listener component 708.

In one embodiment, the listener component 708 is configured to process audio or video data and to generate fingerprint data that may uniquely identify a work of media content represented by the audio or video data. It should be recognized that the listener component 708 utilizes fingerprinting algorithms corresponding to the algorithms used by fingerprint generator 702 such that a particular work of media content 104 processed by the fingerprint generator 702 and the listener component 708 results in the same fingerprint value.

The listener component 708 coordinates with the content provider 102 to perform content recognition of processed audio and/or video data and enable in-game content to be unlocked. In one embodiment, the listener component 708 may match generated fingerprints against a local cache of fingerprints 712 stored within storage 208. The local cache of fingerprints 712 may be pre-determined and provided with installation of the game application 112 and/or may be periodically provided by the content provider 102 (e.g., in the form of updates to the game application 112). The listener component 708 is configured to transmit an unlock request to the content provider 102 after finding a fingerprint that matches one of the local cache of fingerprints 712. The operations of fingerprint generator 702, fingerprint search system 710, and listener component 708 are described in further detail in FIG. 8.

Figure 8:
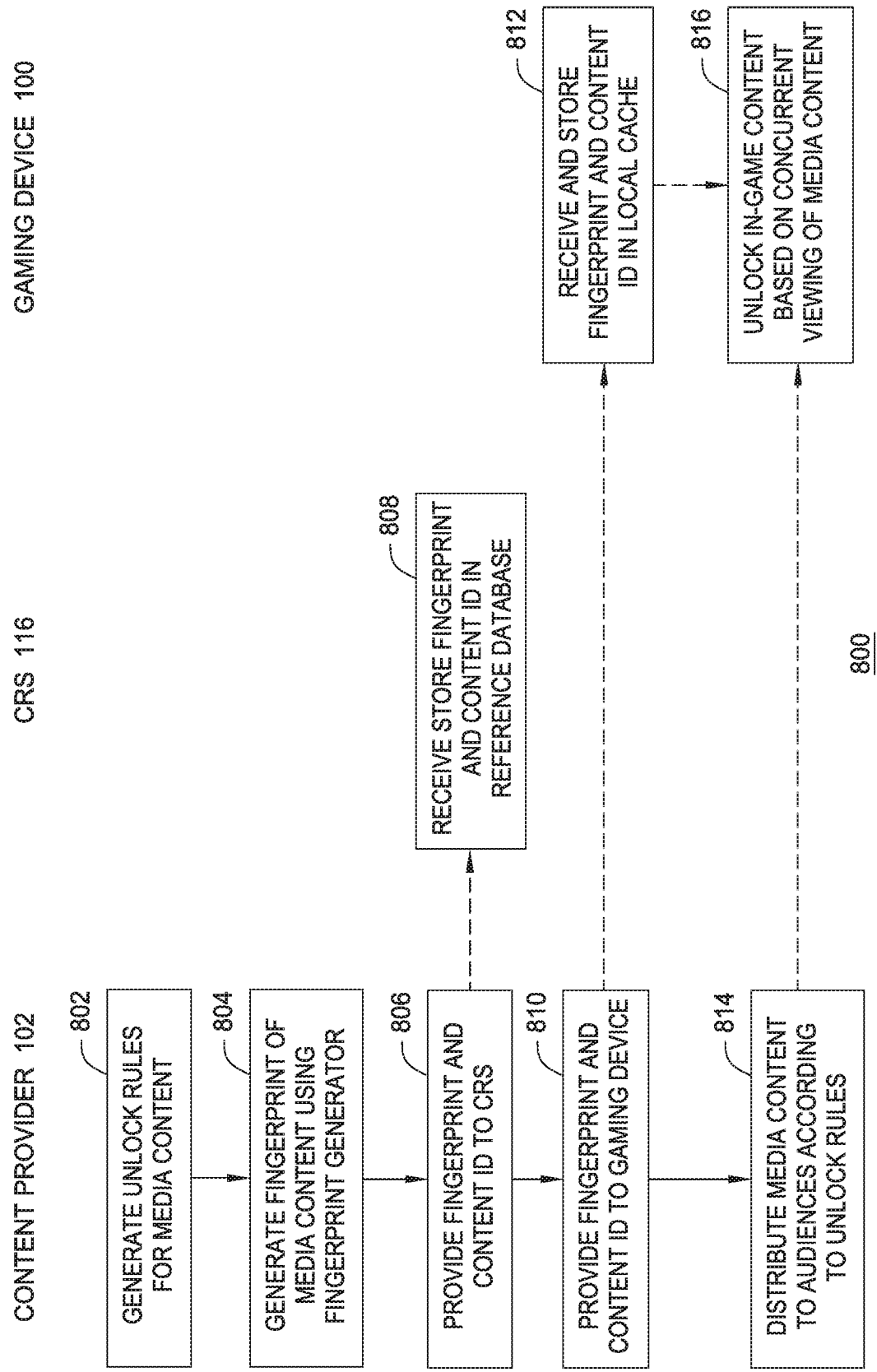
FIG. 8 is a flowchart depicting a method for unlocking in-game content of a video game application using a content recognition technique of fingerprinting, according to one embodiment of the disclosure.

FIG. 8 is a flowchart depicting a method 800 for unlocking in-game content of a video game application using content recognition technique of fingerprinting, according to one embodiment of the disclosure. It should be recognized that, even though the method is described in conjunction with the systems of FIG. 1 and FIG. 7, any system configured to perform the method steps, in any order, is within the scope of embodiments of the disclosure.

As shown, the method 800 begins at step 802, where the content provider 102 generates one or more unlock rules 232 for media content 104.

In some embodiments, the unlock rules 232 may specify how a particular work of media content 104 may be used to unlock the in-game content 114, what level of similarity is permitted before declaring a match of media content 104, etc. In step 804, the content provider 102 uses to the fingerprint generator 702 to process media content 104 and generate a fingerprint of a work of media content 104. A variety of processing algorithms may be utilized, alone or in combination, to generate a uniquely identifiable representation of audio and/or video data within media content 104. By way of example, the fingerprint generator 702 may utilize Mel-frequency cepstral coefficients (MFCCs) with coefficient quantization and signature generation to generate a representation of a short-term power spectrum of sound from the audio track of media content 104.

In step 806, the content provider 102 provides the fingerprint, as well as a content identifier associated with the work of media content 104, to the content recognition system 116. In step 808, the content recognition system 116 receives and stores the fingerprint and content identifier within the reference database 704. The content identifier enables components of the system 700 to quickly and uniquely refer to each work of media content 104.

In some embodiments, in step 810, the content provider 102 provides the generated fingerprint and content identifier to the gaming device 110 as an update to the game application 112. In step 812, the gaming device 110 receives and stores the fingerprint and content identifier within the local cache of fingerprints 712.

In step 814, the content provider 102 distributes the media content 104 to audiences according to the unlock rules 232. In the embodiment illustrated in FIG. 7, the content provider 102 distributes the media content through broadcast or other transmission channels for a television medium. In step 816, a user of the gaming device 110 views the media content 104 using a television 106 (or any suitable player of media content). While concurrently viewing the media content 104, the user 100 launches the video game application 112 within the gaming device 110. The video game application 112 unlocks in-game content 114 based on the concurrent viewing of the media content 104. Step 816 is further described in further detail in conjunction with FIG. 9.

Figure 9:
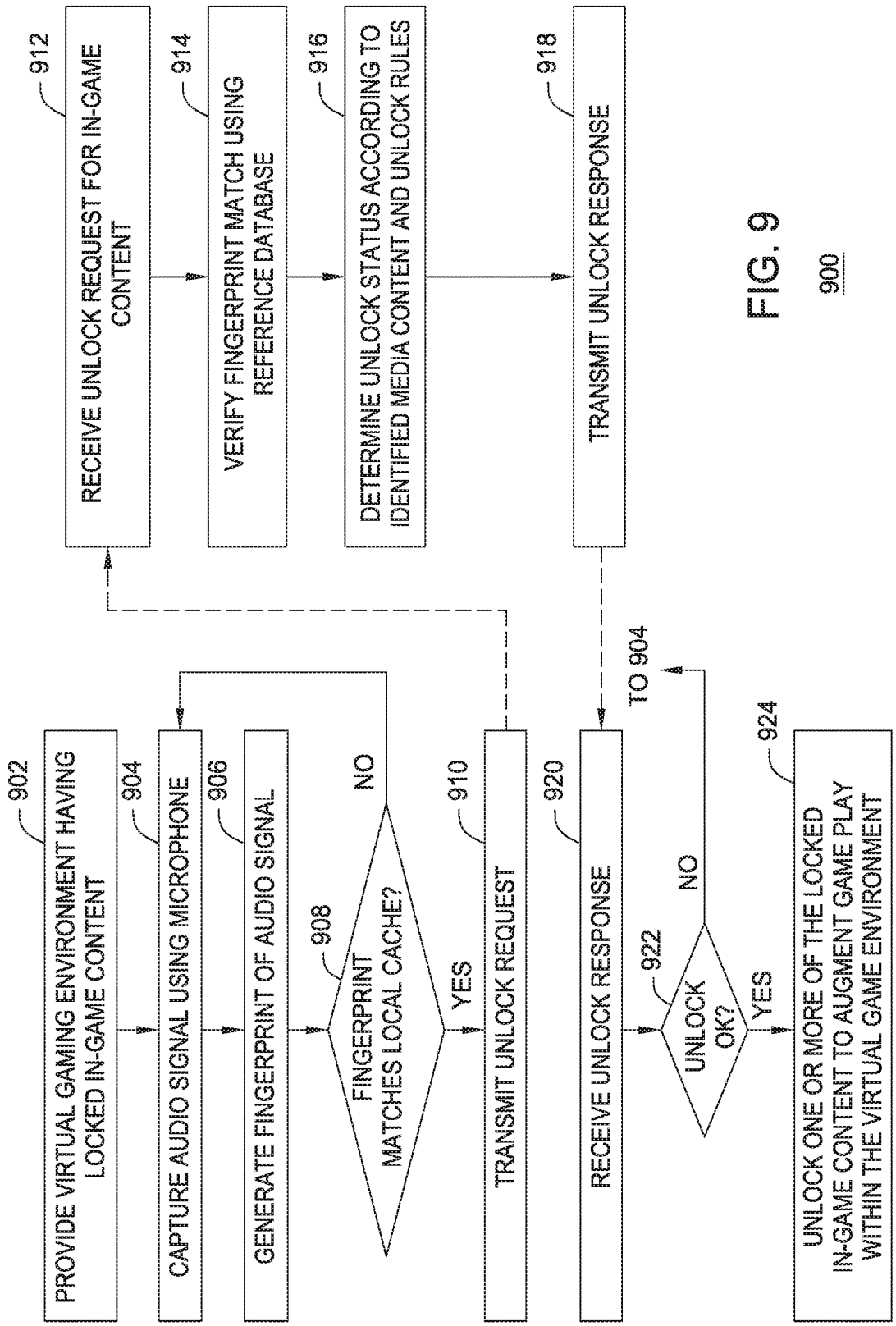
FIG. 9 is a flowchart depicting a method for modifying a video game application based on media content recognized by fingerprinting, according to one embodiment of the present disclosure.

FIG. 9 is a flowchart depicting a method 900 for modifying a video game application 112 based on media content 104 recognized by fingerprinting, according to one embodiment of the present disclosure. As with FIG. 8, it should be recognized that, even though the method is described in conjunction with the systems of FIG. 1 and FIG. 7, any system configured to perform the method steps, in any order, is within the scope of embodiments of the invention.

In step 902, the gaming device 110 executes the video game application 112 to provide a virtual gaming environment having unlockable in-game content 114. In step 904, the gaming device 110 generates an audio signal based on sound captured from an environment proximate to the gaming device 110 using input devices 214, such as a microphone of the gaming device 110. For example, if the user 100 is operating the gaming device 110 while in a same room as a television 106 playing encoded media content 104 (e.g., show or movie), a microphone of the gaming device 110 picks up the sound from the television.

In step 906, the listener component 708 of the video game application 112 generates a fingerprint of the audio signal. In some embodiments, the listener component 708 analyzes various characteristics of the audio signal to capture a small signature file that represents the audio signal captured by the gaming device 110. In step 908, the listener component 702 determines whether the fingerprint (generated in step 906) matches any one of reference fingerprints stored within the local cache of fingerprints 712. In some embodiments, the listener component 702 may compare the generated fingerprint to the reference fingerprints and look for multiple points of similarity sufficient to declare a match. Responsive to determining that the generated fingerprint does not match any of the reference fingerprints stored in the local cache 712, operation returns to step 904, wherein the listener component 708 continues to capture and process audio signals until a match is found.

Responsive to determining that the generated fingerprint matches at least one of the fingerprints in the local cache of fingerprints 712, in step 910, the listener component 708 prepare and transmits an unlock request for in-game content 114 to the content provider 102. The unlock request may contain a copy of the generated fingerprint that produced the match, metadata identifying the gaming device 110 and the gaming application 112, and metadata representing the current state of the gaming application 112 including the locked or unlocked status of in-game content 114.

In step 912, the content provider 102 receives the unlock request for the in-game content 114 from the gaming device 110. In step 914, the content provider 102 verifies the received fingerprint matches at least one work of media content 104 using reference database 704. In some embodiments, the content provider 102 queries the fingerprint search system 710, which executes a search of all fingerprints 706 for a match of the fingerprint received from the gaming device 110. The fingerprint search system 710 returns a response to the content provider 102, indicating match or no match. If a match has been found, the fingerprint search system 710 may provide the content provider 102 with a content identifier associated with the matched media content 104.

In step 916, the content provider 102 determines an unlock status of one or more portions of in-game content 114 according to the identified media content 104 and the unlock rules 232. In one embodiment, the content provider 102 determines an unlock status based on an unlock rule 232 that associates the matched media content 104 being viewed by the user 100 of the gaming device 110 with an unlockable in-game content 114.

In step 918, the content provider 102 transmits a response to the unlock request comprised of the determined unlock status, and in turn, in step 920, the gaming device 110 receives the unlock response. In step 922, responsive to determining that the received unlock response comprises an indication that unlocking in-game content 114 is not authorized at this time, the operation of the gaming device 110 returns to step 904, wherein the gaming device 110 continues to capture and process audio signals until a match is found.

In step 924, responsive to determining that the received unlock response comprises an indication that unlocking in-game content 114 is permits, the game application 112 of the gaming device 110 unlocks one or more of the locked in-game content 114 to augment game play within the virtual gaming environment. In some embodiments, as with method 400 described above, the game application 112 may modify a state of the in-game content 114 to represent that the in-game content has been unlocked.

While an embodiment of system 700 is described in detail herein, it should be recognized that, as with any distributed system, the functional components of system 700 may be provided in alternative configurations and arrangements and remain within the scope of the present disclosure. For example, rather than maintain a local cache of fingerprints 712, the listener component 708 may transmit all generated signatures to a third-party entity, such as content recognition system 116, to match a fingerprint against the reference database 704 of fingerprints 706. Further, although the foregoing embodiments have focused on the analysis and fingerprinting of an audio signal, it should be recognized that any data signal, including video, audio, electrical, or magnetic signals may be processed and analyzed to generate a key or fingerprint value.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
executing, by operation of a computing device, a game environment having locked content that is inaccessible to a user, the locked content having an association with one or more keys;
capturing, using one or more sensors of the computing device, audio data from an external environment;
processing the audio data to generate a key;
determining that the key matches at least one key of the one or more keys associated with the locked content;

modifying the game environment to enable access to at least a portion of the locked content in the game environment; and displaying to the user, via a user interface of the computing device, a notification that access has been enabled to at least the portion of the locked content in the game environment.

2. The computer-implemented method of claim 1, wherein the access to the locked content is enabled based on the determination that the key matches at least one key of the one or more keys associated with the locked content and at least one of (i) player achievement of one or more game objectives of the game environment, or (ii) one or more purchase transactions for gaining access to the locked content.

3. The computer-implemented method of claim 1, further comprising:

modifying the game environment to incorporate one or more player-controllable avatars based on the locked content.

4. The computer-implemented method of claim 1, further comprising:

deciding, by operation of the computing device, to enable the access to at least the portion of the locked content according to one or more rules defining the association, wherein the one or more rules specify a time period in which the association is active.

5. The computer-implemented method of claim 1, further comprising:

modifying the game environment with a persistent change that incorporates at least the portion of the locked content.

6. The computer-implemented method of claim 1, wherein the one or more sensors includes a microphone, and wherein capturing the audio data comprises:

capturing, by operation of the microphone of the computing device, the audio data based on sounds from the external environment.

7. The computer-implemented method of claim 1, further comprising:

decoding at least a portion of the audio data to detect a watermark embedded therein.

8. The computer-implemented method of claim 1, wherein processing the audio data comprises:

generating fingerprint data based on characteristics of the audio data; and matching the fingerprint data to at least one reference fingerprint of a plurality of reference fingerprints.

9. A computer-readable storage medium containing computer-readable program code configured to perform an operation comprising:

executing, by operation of a computing device, a game environment having locked content that is inaccessible to a user, the locked content having an association with one or more keys;

capturing, using one or more sensors of the computing device, audio data from an external environment;

processing the audio data to generate a key;

determining that the key matches at least one key of the one or more keys associated with the locked content;

modifying the game environment to enable access to at least a portion of the locked content in the game environment; and displaying to the user, via a user interface of the computing device, a notification that access has been enabled to at least the portion of the locked content in the game environment.

10. The computer-readable storage medium of claim 9, wherein the access to the locked content is enabled based on the determination that the key matches at least one key of the one or more keys associated with the locked content and at least one of (i) player achievement of one or more game objectives of the game environment, or (ii) one or more purchase transactions for gaining access to the locked content.

11. The computer-readable storage medium of claim 9, wherein the operation further comprises:

modifying the game environment to incorporate one or more player-controllable avatars based on the locked content.

12. The computer-readable storage medium of claim 9, wherein the operation further comprises:

deciding, by operation of the computing device, to enable access to at least the portion of the locked content according to one or more rules defining the association, wherein the one or more rules specify a time period in which the association is active.

13. The computer-readable storage medium of claim 9, wherein the operation further comprises:

modifying the game environment with a persistent change that incorporates at least the portion of the locked content.

14. The computer-readable storage medium of claim 9, wherein the one or more sensors includes a microphone, wherein capturing the audio data comprises:

capturing, by operation of the microphone of the computing device, the audio data based on sounds from the external environment.

15. The computer-readable storage medium of claim 9, wherein capturing the audio data comprises:

decoding at least a portion of the audio data to detect a watermark embedded therein.

16. The computer-readable storage medium of claim 9, wherein processing the audio data comprises:

generating fingerprint data based on characteristics of the audio data; and matching the fingerprint data to at least one reference fingerprint of a plurality of reference fingerprints.

17. A computing system comprising:

one or more computer processors;

a user interface;

a memory comprising (i) a program configured to provide a game environment and (ii) locked content, of the game environment, having an association with one or more keys; and a microphone configured to capture audio data based on sounds from an external environment;

wherein the program, when executed by the one or more computer processors, performs an operation comprising:

processing audio data received from the microphone to generate a key of the one or more keys;

enabling access to at least a portion of the locked content based on the key;

augmenting gameplay of the game environment based on at least the portion of the locked content; and displaying to a user, via the user interface, a notification that access has been enabled to at least the portion of the locked content in the game environment.

18. The computing system of claim 17, wherein the access to the locked content is enabled further based on at least one of (i) player achievement of one or more game objectives of the game environment, or (ii) one or more purchase transactions for gaining access to the locked content.

19. The computing system of claim 17, wherein the operation further comprises:
  modifying the game environment with a persistent change that incorporates at least the portion of the locked content.

20. The computing system of claim 17, wherein processing the audio data comprises:
  generating fingerprint data based on characteristics of the audio data; and
  matching the fingerprint data to at least one reference fingerprint of a plurality of reference fingerprints.

* * * * *